(12) United States Patent
Bolen et al.

(10) Patent No.: US 9,086,945 B2
(45) Date of Patent: Jul. 21, 2015

(54) SYSTEM AND METHOD TO CORRELATE ERRORS TO A SPECIFIC DOWNSTREAM DEVICE IN A PCIE SWITCHING NETWORK

(75) Inventors: Austin Bolen, Austin, TX (US); Surender V. Brahmaroutu, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 917 days.

(21) Appl. No.: 13/224,008

(22) Filed: Sep. 1, 2011

(65) Prior Publication Data
US 2013/0060987 A1 Mar. 7, 2013

(51) Int. Cl.
G06F 13/20 (2006.01)
G06F 13/00 (2006.01)

(52) U.S. Cl.
CPC ..................................... G06F 13/00 (2013.01)

(58) Field of Classification Search
None
See application file for complete search history.

(56) References Cited

U.S. PATENT DOCUMENTS

| | | | |
|---|---|---|---|
| 7,136,993 B2 | 11/2006 | Bolen et al. | |
| 7,502,919 B2 | 3/2009 | Bolen et al. | |
| 7,603,500 B2 | 10/2009 | Brahmaroutu | |
| 2005/0273587 A1 | 12/2005 | Wynn et al. | |
| 2006/0085690 A1 | 4/2006 | Bolen et al. | |
| 2006/0233164 A1 | 10/2006 | Brahmaroutu et al. | |
| 2007/0064623 A1 | 3/2007 | Brahmaroutu | |
| 2007/0300241 A1 | 12/2007 | Prakash et al. | |
| 2008/0002694 A1 | 1/2008 | Brahmaroutu et al. | |
| 2008/0005372 A1 | 1/2008 | Bolen et al. | |
| 2009/0248949 A1 | 10/2009 | Khatri et al. | |
| 2009/0287916 A1 | 11/2009 | Jaber et al. | |
| 2009/0292960 A1 | 11/2009 | Haraden et al. | |
| 2010/0175064 A1 | 7/2010 | Brahmaroutu | |
| 2010/0306434 A1 | 12/2010 | Dube et al. | |
| 2011/0138082 A1 | 6/2011 | Khatri et al. | |
| 2012/0311373 A1* | 12/2012 | Chencinski et al. | ............... 714/2 |

* cited by examiner

*Primary Examiner* — Idriss N Alrobaye
*Assistant Examiner* — Dayton Lewis-Taylor
(74) *Attorney, Agent, or Firm* — Larson Newman, LLP (57) ABSTRACT

A Peripheral Component Interconnect-Express (PCIe) port includes a PCIe link, a pending transaction counter, and an error status register. The PCIe port operates to issue a transaction on the PCIe link, determine that an endpoint device has become uncoupled from the PCIe link after issuing the first transaction, determine that a value stored in the pending transaction counter is not equal to zero in response to determining that the endpoint device has become uncoupled, and set an error bit in the error status register in response to determining that the first value is not equal to zero.

17 Claims, 4 Drawing Sheets

SYSTEM AND METHOD TO CORRELATE ERRORS TO A SPECIFIC DOWNSTREAM DEVICE IN A PCIE SWITCHING NETWORK

FIELD OF THE DISCLOSURE

The present disclosure generally relates to information handling systems, and more particularly relates to correlating errors to a specific downstream device in a PCIe switching network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handlings systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. Other teachings can be used in this application, and the teachings can be used in other applications and with different types of architectures, such as a client-server architecture, a distributed computing architecture, or a middleware server architecture and associated resources.

Figure 1:
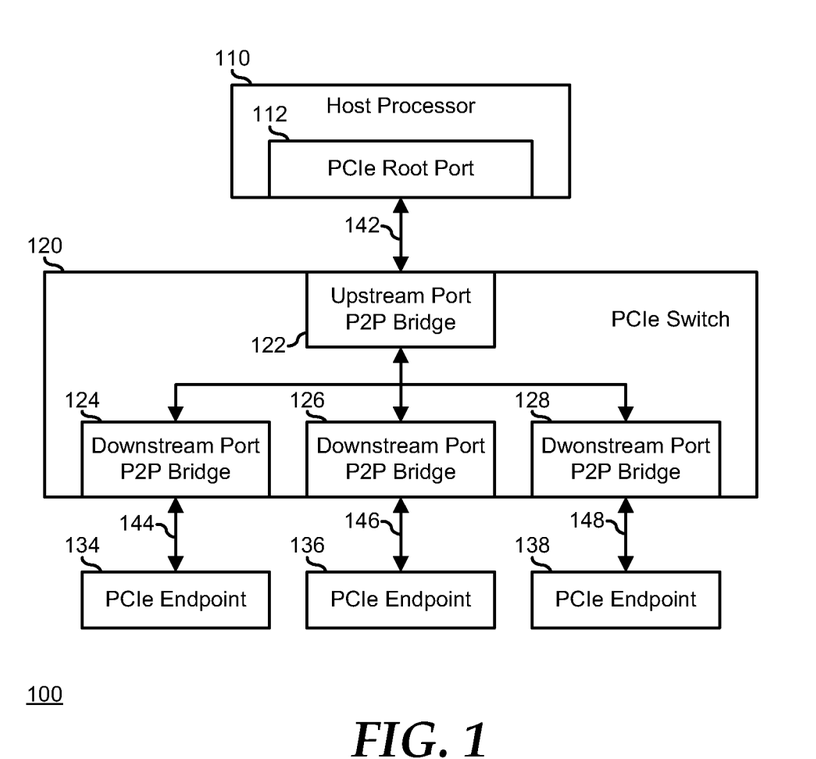
FIG. 1 is a block diagram illustrating an information handling system with Peripheral Component Interconnect-Express (PCIe) interface elements.

FIG. 1 illustrates an embodiment of an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Information handling system 100 includes a host processing system 110, a PCIe switch 120 and PCIe endpoints 134, 136, and 138. Host processing system 110 includes a PCIe root port 112. PCIe switch 120 includes an upstream port (USP) PCIe-to-PCIe (P2P) bridge and downstream port (DSP) P2P bridges 124, 126, and 128. PCIe root port 112 is connected to USP P2P bridge 122 via PCIe link 142. In a particular embodiment, PCIe link 142 includes one or more PCIe data communication lanes, where each lane includes a serial transmit lane and a serial receive lane. For example, the PCIe link 142 can be a by-1 (×1) PCIe link with a single lane, a by-2 (×2) PCIe link with two lanes, or similarly configured by-4 (×4), by-8 (×8), or by-16 (×16) PCIe links. USP P2P bridge 122 is connected to DSP P2P bridges 124, 126, and 128. In a particular embodiment, the data connection between USP P2P bridge 122 and DSP P2P bridges 124, 126, and 128 includes a bus structure between the elements of PCIe switch 120. In another embodiment, USP P2P bridge 122 provides separate PCIe links for each of DSP P2P bridges 124, 126, and 128, where each PCIe link is a ×1, ×2, ×4, ×8, or ×16 PCIe link. DSP P2P bridge 124 is connected to PCIe endpoint 134 via PCIe link 144, DSP P2P bridge 126 is connected to PCIe endpoint 136 via PCIe link 146, and DSP P2P bridge 128 is connected to PCIe endpoint 138 via PCIe link 148. PCIe links 144, 146, and 148 can be ×1, ×2, ×4, ×8, or ×16 PCIe links. In a particular embodiment, PCIe links 142, 144, 146, and 148 include the same number of lanes. For example, each of PCIe links 142, 144, 146, and 148 can be ×4 PCIe links. In another embodiment, PCIe links 142, 144, 146, and 148 include different numbers of lanes, as needed or desired. For example, PCIe link 142 can be a ×16 PCIe link, PCIe link 144 can be a ×8 PCIe link, PCIe link 146 can be a ×4 PCIe link, and PCIe link 148 can be a ×2 PCIe link. Here one or more of P2P bridges 122, 124, 126, and 128 operate to bridge between the various numbers of lanes as needed or desired. As used herein, host processing system 110 can include one or more processors, one or more virtualized processors, a system management processor, or another processing complex as needed or desired.

In operation, information handling system 100 operates to communicate information between host processor 110 and PCIe endpoints 134, 136, and 138. As such, host processor 110 provides information to be transferred to one of PCIe endpoints 134, 136, or 138 to PCIe root port 112. PCIe root port 112 issues one or more transactions that include the information on a PCIe link 142. USP P2P bridge 122 receives the transactions, determines whether the transactions are destined for PCIe endpoint 134, for PCIe endpoint 136, or for PCIe endpoint 138, and routes the transactions accordingly to DSP P2P bridge 124, to DSP P2P bridge 126, or to DSP P2P bridge 128. DSP P2P bridge 124 issues transactions destined to PCIe endpoint 134 via PCIe link 144, DSP P2P bridge 126 issues transactions destined to PCIe endpoint 136 via PCIe link 146, and DSP P2P bridge 128 issues transactions destined to PCIe endpoint 138 via PCIe link 148. Similarly, transactions from PCIe endpoints 134, 136, and 138 are issued to their respective DSP P2P bridges 124, 126, and 128, to USP P2P bridge 122, to PCIe root port 112 and to host processor 110.

Figure 2:
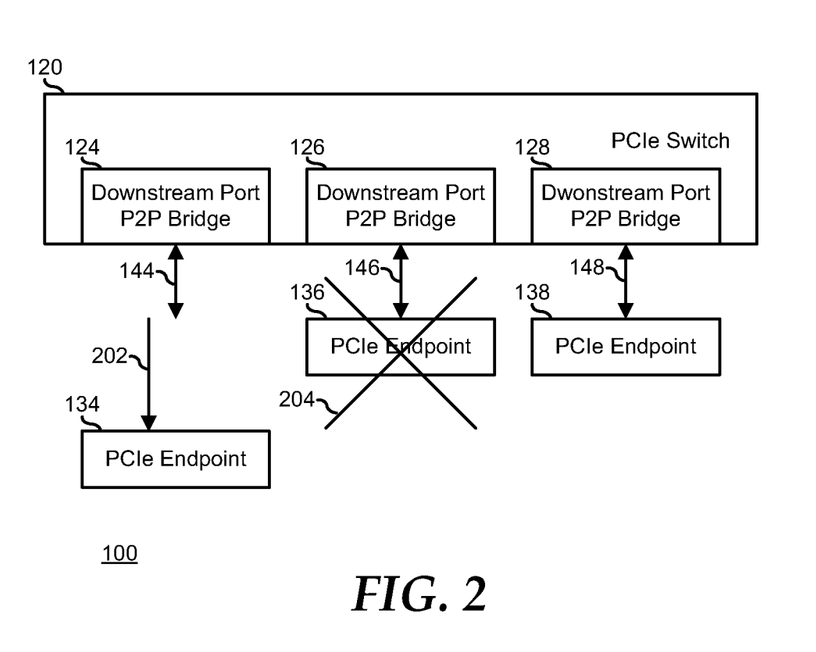
FIG. 2 is a block diagram illustrating the information handling system of FIG. 1 and PCIe endpoints being functionally disconnected from the information handling system.

FIG. 2 illustrates PCIe endpoints 134 and 136 being functionally disconnected from information handling system 100. Here, PCIe endpoint 134 is shown as being removed from information handling system 100, as indicated by the arrow 202, and PCIe endpoint 136 is shown as remaining connected to the information handling system, but losing the ability to function properly, as indicated by the cross 204. The removal of PCIe endpoint 134 can be expected or unexpected. For example, in an expected removal, a user of information handling system 100 can initiate a routine on the information handling system that operates to shut down PCIe link 144, and permits the removal of PCIe endpoint 134 without disrupting the operation of the information handling system. In an unexpected removal, the user merely removes PCIe endpoint 134 from information handling system 100 without warning. PCIe endpoint 136 can lose functionality in a number of ways that are known in the art, and that are indicated by one or more known correctable and uncorrectable error bits in various registers of DSP P2P bridge 126. Further discussion of the various error conditions within PCIe endpoints shall not be undertaken herein, except as needed to illustrate the various embodiments of the disclosure.

In a particular embodiment, when PCIe root port 112 issues a transaction to one of PCIe endpoints 134, 136, or 138, the PCIe root port starts a completion timeout counter. If PCIe root port 112 fails to receive an acknowledgment that the transaction has been completed by the endpoint before the completion timeout counter expires, then the PCIe root port assumes that there is a problem with one or more of P2P bridges 122, 124, 126, and 128, and PCIe endpoints 134, 136, and 138, and the PCIe root port proceeds to read error status registers in the P2P bridges and the PCIe endpoints to determine the course of action to take in response to the timeout. If the problem is the result of a correctable error, the host processor will initiate the appropriate error handling routines to correct the error in the P2P bridge or endpoint that is experiencing the problem. If the problem is the result of an uncorrectable error, the host processor will initiate fatal error handling routines, such as a "blue screen of death" (BSOD) in a Windows environment.

Figure 3:
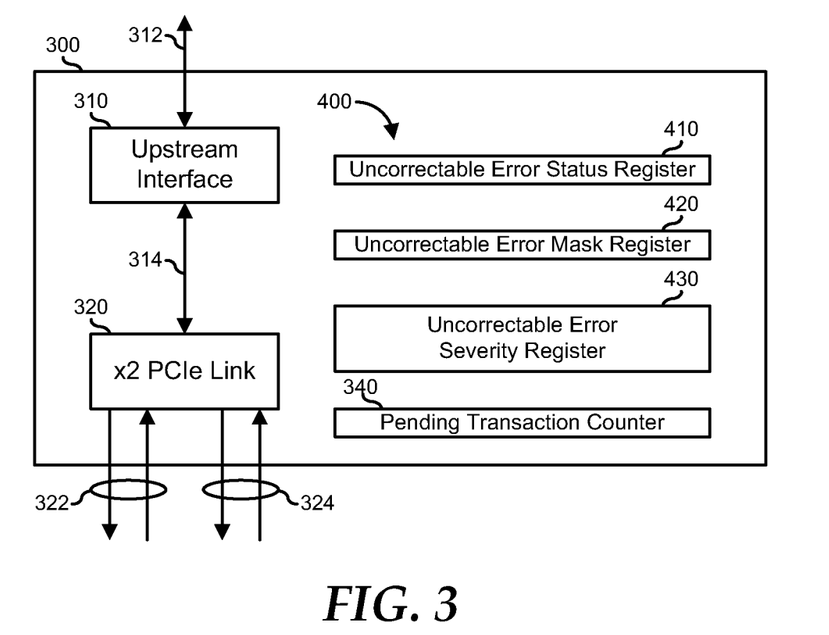
FIG. 3 is a block diagram illustrating a PCIe downstream port of the information handling system of FIG. 1.

FIG. 3 illustrates a DSP P2P bridge 300, similar to DSP P2P bridges 124, 126, and 128. DSP P2P bridge 300 includes an upstream interface 310, a PCIe link 320, a pending transaction counter 340, and uncorrectable error registers 400. Upstream interface 310 includes a data connection 312 that is connected to a USP P2P bridge similar to USP P2P bridge 122, and can represent a bus structure or a PCIe link. Upstream interface 310 also includes a data connection 314 that is connected to PCIe link 320, and can represent a bus structure or a PCIe link. PCIe link 320 is a ×2 PCIe link and includes a PCIe data communication lane 322 and a PCIe data communication lane 324. PCIe link 320 can be connected to a PCIe endpoint similar to PCIe endpoints 134, 136, or 138. PCIe data communication lanes 322 and 324 each include a serial transmit lane and a serial receive lane.

Uncorrectable error registers 400 include an uncorrectable error status register 410, an uncorrectable error mask register 420, and an uncorrectable error mask register 430. Uncorrectable error status register 410 includes bit locations that indicate the existence of various uncorrectable error conditions that can exist in DSP P2P bridge 300, as are known in the art and as described below. The presence of a logic 0 (zero) in a particular bit location of uncorrectable error status register 410 indicates that the associated error condition is not present in DSP P2P bridge 300, and the presence of a logic 1 (one) in that bit location indicates that the associated error condition is present in the DSP P2P bridge. Uncorrectable error mask register 420 includes bit locations that are associated with the respective bit locations in uncorrectable error status register 410, and that indicate whether or not the existence of the various uncorrectable error conditions in DSP P2P bridge 300 are to be reported to a PCIe root port similar to PCIe root port 112, such as by issuing an advanced error reporting (AER) packet to the PCIe root port. The presence of a logic 0 in a particular bit location of uncorrectable error mask register 420 indicates that the existence of the associated error condition is reported to the PCIe root port, and the presence of a logic 1 in that bit location indicates that the existence of the associated error condition is not reported to the PCIe root port. Uncorrectable error severity register 430 includes bit locations that are associated with the respective bit locations in uncorrectable error status register 410, and that indicate whether or not the existence of the various uncorrectable error conditions in DSP P2P bridge 300 are to be considered as severe errors. The presence of a logic 0 in a particular bit location of uncorrectable error severity register 430 indicates that the associated error condition is not considered to be severe, and the presence of a logic 1 in that bit location indicates that the associated error condition is considered to be severe.

Pending transaction counter 340 operates to keep a count of the number of transactions issued by PCIe link 320 that have not been acknowledged or completed. Pending transaction counter 340 is incremented when PCIe link 320 issues non-posted transactions, and the pending transaction counter is decremented when the PCIe link receives an acknowledgement of an issued non-posted transaction or an indication that an issued non-posted transaction has been completed. As such:

$$C_P = C_{I-CC} \qquad \text{Equation 1}$$

where $C_P$ is the pending transaction count, $C_I$ is the issued non-posted transaction count and $C_C$ is the completed transaction count.

Figure 4:
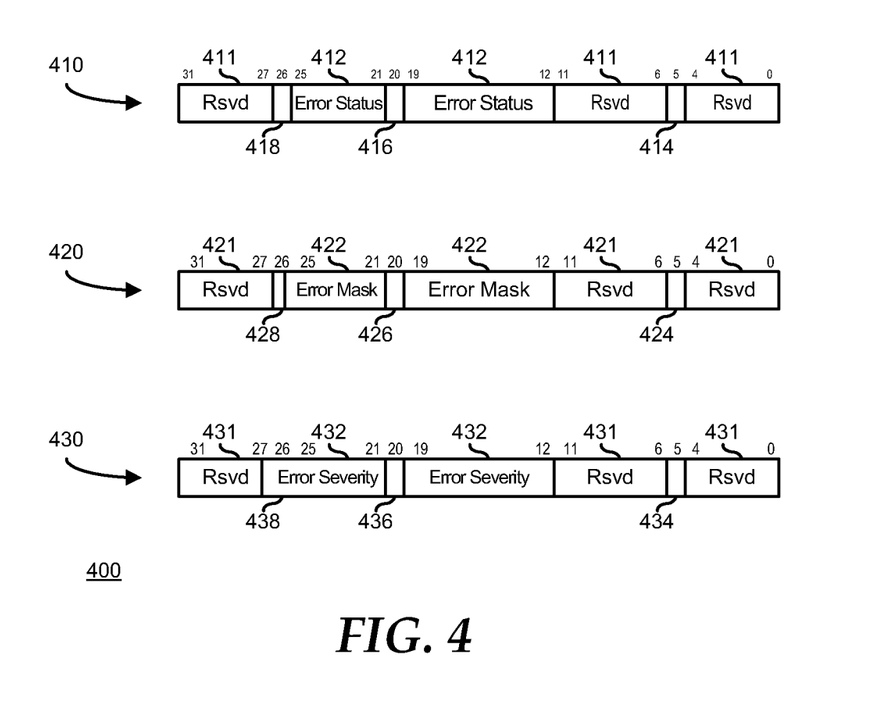
FIG. 4 is a diagram illustrating uncorrectable error registers in the PCIe downstream port of FIG. 3.

FIG. 4 illustrates uncorrectable error registers 400. Uncorrectable error status register 410 is a 32-bit register and includes reserved bits 411 (bits 0-4, 6-11, and 27-31), and error status bits 412 (bits 12-19, and 21-25). Uncorrectable error status register 410 also includes a surprise down (SD) error status bit 414 (bit 5), an unsupported request (UR) error status bit 216 (bit 20), and a link down with transaction pending (LDTP) error status bit 218 (bit 26). Uncorrectable error mask register 420 is a 32-bit register and includes reserved bits 421 (bits 0-4, 6-11, and 27-31), and error mask bits 422 (bits 12-19, and 21-25). Uncorrectable error mask register 420 also includes an SD error mask bit 424 (bit 5), an UR error mask bit 226 (bit 20), and an LDTP error mask bit 228 (bit 26). Uncorrectable error severity register 430 is a 32-bit register and includes reserved bits 431 (bits 0-4, 6-11, and 27-31), and error severity bits 432 (bits 12-19, and 21-25). Uncorrectable error severity register 430 also includes an SD error severity bit 434 (bit 5), an UR error severity bit 236 (bit 20), and an LDTP error severity bit 238 (bit 26). It will be understood that the functionality of LDTP error status bit 218, of LDTP error mask bit 228, and of LDTP error severity bit 238 can be provided by placing the bits in a different reserved bit location in the respective registers 410, 420, and 430, as needed or desired.

In addition to communicating information between a host processor similar to host processor 110 and a PCIe endpoint, DSP P2P bridge 300 operates to determine if a PCIe endpoint is connected to PCIe link 320, to determine if the removal of the PCIe endpoint was expected or unexpected, to determine the error status of the DSP P2P bridge, of the PCIe endpoint, and of PCIe data communication lanes 322 and 324, and to report errors to the root port. DSP P2P bridge 300 detects the presence of an endpoint on PCIe link 320, and also detects when the endpoint is removed or disconnected from the PCIe link. If the endpoint is removed in a way that is unexpected, then DSP P2P bridge 300 sets (writes a logic 1 to) SD error status bit 414. In a particular embodiment, SD mask bit 424 stores a logic 0, and the setting of SD error status bit 414 is reported to the PCIe root port by issuing an AER packet. In another embodiment, SD mask bit 424 stores a logic 1, and the setting of SD error status bit 414 is not reported to the PCIe root port. In this embodiment, the fact that SD error status bit 414 is set may go unnoticed by the PCIe root port until a transaction is issued to DSP P2P bridge 300, and the completion timeout counter in the PCIe root port times out. Then, an error handling system can read uncorrectable error status register 410 to determine that SD error status bit 414 is set, and can initiate the appropriate error handling routines to handle the fact that the transaction was issued to an endpoint that is not present. In either embodiment, SD error severity bit 434 can store a logic 0 or a logic 1, and the host processor can initiate the appropriate error handling routines to handle the error in DSP P2P bridge 300 or can initiate a fatal error handling routines, as needed or desired.

If DSP P2P bridge 300 receives a transaction, but the DSP P2P bridge has determined that no PCIe endpoint is connected to PCIe link 320, then the DSP P2P bridge sets UR error status bit 416. In a particular embodiment, UR mask bit 426 stores a logic 0, and the setting of UR error status bit 416 is reported to the PCIe root port by issuing an AER packet. In another embodiment, UR mask bit 426 stores a logic 1, and the setting of UR error status bit 416 is not reported to the PCIe root port. In this embodiment, the fact that UR error status bit 416 is set will go unnoticed by the PCIe root port. In either embodiment, UR error severity bit 436 can store a logic 0 or a logic 1, and the host processor can initiate the appropriate error handling routines to handle the error in DSP P2P bridge 300 or can initiate a fatal error handling routines, as needed or desired.

If DSP P2P bridge 300 receives a non-posted transaction, and the DSP P2P bridge has determined that a PCIe endpoint is connected to PCIe link 320, then the PCIe link 320 issues the non-posted transaction to the PCIe endpoint, and increments pending transaction counter 340. If, while the transaction is pending, DSP P2P bridge 300 determines that the PCIe endpoint has become disconnected from PCIe link 320, then the DPS P2P bridge sets LDTP error status bit 418. In a particular embodiment, LDTP mask bit 428 stores a logic 0, and the setting of LDTP error status bit 418 is reported to the PCIe root port by issuing an AER packet. In another embodiment, LDTP mask bit 428 stores a logic 1, and the setting of LDTP error status bit 418 is not reported to the PCIe root port. In this embodiment, the fact that LDTP error status bit 418 is set will go unnoticed by the PCIe root port until the completion timeout counter in the PCIe root port times out. Then, the Error handling system can read uncorrectable error status register 410 to determine that LDTP error status bit 418 is set, and can initiate the appropriate error handling routines to handle the fact that the transaction was issued to an endpoint that was disconnected from PCIe link 320 prior to completion of the transaction. In either embodiment, LDTP error severity bit 438 can store a logic 0 or a logic 1, and the host processor can initiate the appropriate error handling routines to handle the error in DSP P2P bridge 300 or can initiate a fatal error handling routines, as needed or desired. For example, if the PCIe endpoint is a video adapter, then removal may be deemed to be a severe error, and a fatal error handling routine may be desirable. However, if the PCIe endpoint is a removable memory device, then removal may be deemed not to be a severe error, and the error handling routine can include steps to dismount the memory device from the PCIe configuration space associated with the PCIe root port.

Figure 5:
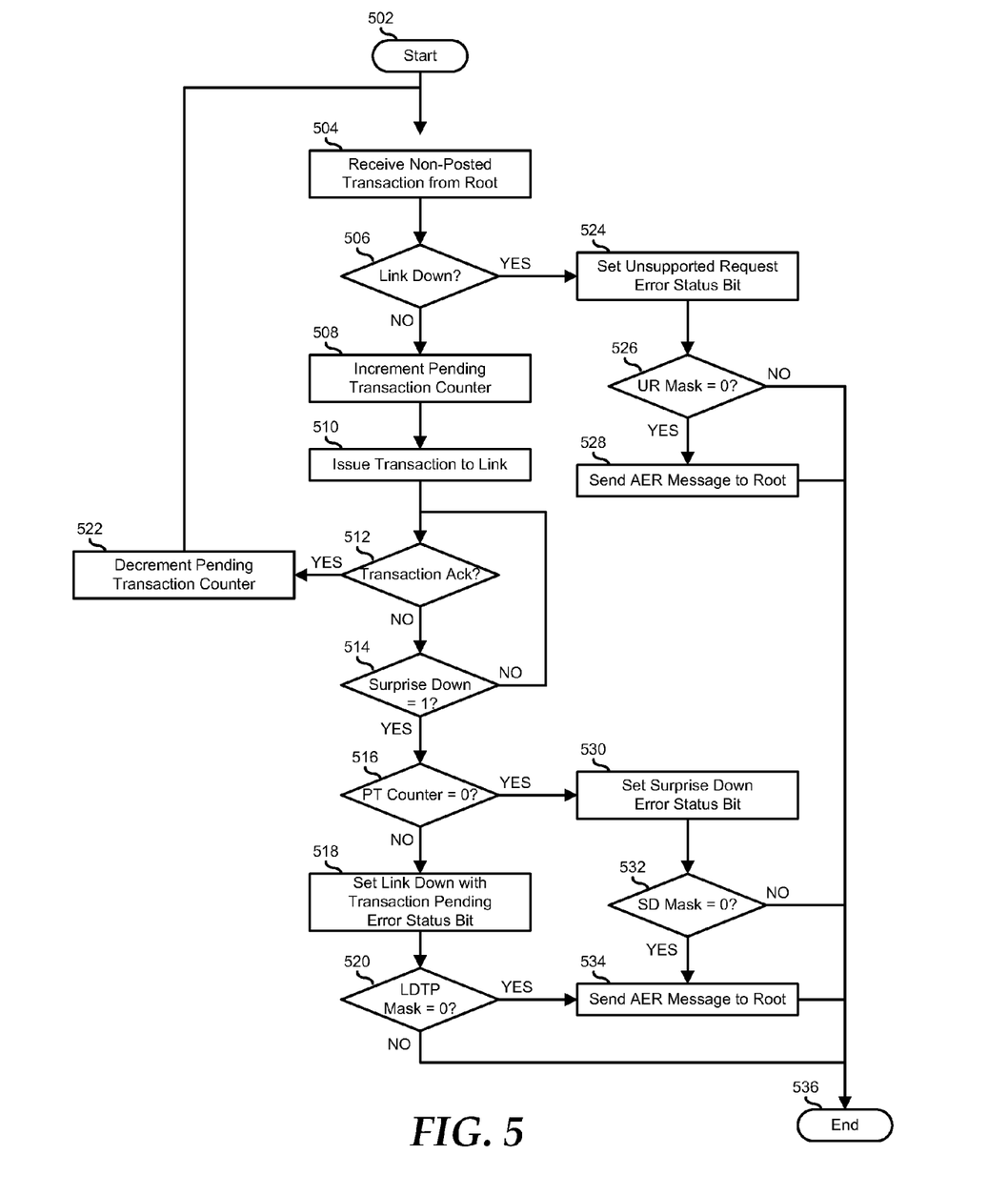
FIG. 5 is a flowchart illustrating a method of setting error conditions in a downstream port.

FIG. 5 illustrates a method of setting error conditions in a DSP similar to DSP P2P bridge 300. The method starts at block 502 and a DSP receives a non-posted transaction from a PCIe root port in block 504. For example, DSP P2P bridge 300 can receive a non-posted transaction from a PCIe root port. A decision is made as to whether or not a link associated with the DSP is down decision block 506. For example, an endpoint can be connected to PCIe link 320, or the PCIe link can have no endpoint connected. If the link is not down, the NO branch of decision block 506 is taken, and the method continues in block 508, as described below. If the link is down, the YES branch of decision block 506 is taken and the DSP sets an unsupported request error status bit in block 524. For example, UR error status bit 416 can be set with a logic 1. A decision is made as to whether or not an unsupported request mask bit is cleared (i.e., the bit value is a logic "0") in decision block 526. For example, UR error mask bit 426 can include a logic 0 or a logic 1. If the unsupported request mask bit is not cleared, the NO branch of decision block 526 is taken and the method ends in block 536. If the unsupported request mask bit is cleared, the YES branch of decision block 526 is taken, an AER message is sent to the root port in block 528, and the method ends in block 536. For example, DSP P2P bridge 300 can send an AER message to the root port.

If the link is not down as determined in decision block 506, the NO branch is taken, a pending transaction counter is incremented in block 508, and the transaction is issued to the link in block 510. For example, pending transaction counter 340 can be incremented by having one added to the value in the pending transaction counter. A decision is made as to whether or not the transaction has been acknowledged in decision block 512. For example, the endpoint can provide an acknowledgement that the transaction has been received or is completed. If the transaction has been acknowledged, the YES branch of decision block 512 is taken, the pending transaction counter is decremented in block 522, and the method returns to block 504, where the DSP receives another transaction from the PCIe root port. Here, pending transaction counter 340 can be decremented by having one subtracted from the value in the pending transaction counter. If the transaction has not been acknowledged, the NO branch of decision block 512 is taken and a decision is made as to whether or not a surprise down error status bit is set in decision block 514. For example, SD error status bit 414 can include a logic 0 or a logic 1. If the surprise down error status bit is not set, the NO branch of decision block 514 is taken and the method returns to decision block 512 where a decision is made as to whether or not the transaction has been acknowledged. In a particular embodiment, when the surprise down error status bit is set, a decision is made as to whether or not a surprise down error mask bit is set, and if so, then an AER message is sent to the root port.

If the surprise down error status bit is set as determined in decision block 514, the YES branch is taken and a decision is made as to whether or not the pending transaction counter is equal to zero in decision block 516. For example, pending transaction counter 340 can have a value that is equal to zero or have a non-zero value. If the pending transaction counter is not equal to zero, the NO branch of decision block 516 is taken, and the method continues in block 518, as described below. If the pending transaction counter is equal to zero, the YES branch of decision block 516 is taken and the DSP sets a surprise down error status bit in block 530. For example, SD error status bit 414 can be set with a logic 1. In a particular embodiment, not illustrated, a hot-plug controller can support the surprise removal of an endpoint, the surprise down error is not reported, and the method ends in block 536. A decision is made as to whether or not a surprise down error mask bit is cleared (i.e., the bit value is a logic "0") in decision block 532. For example, SD error mask bit 424 can include a logic 0 or a logic 1. If the surprise down error mask bit is not cleared, the NO branch of decision block 532 is taken and the method ends in block 536. If the surprise down error mask bit is cleared, the YES branch of decision block 532 is taken, an AER message is sent to the root port in block 534, and the method ends in block 536.

If the pending transaction counter is not equal to zero as determined in decision block 516, the NO branch is taken and a link down with transaction pending error status bit is set in block 518. For example, LDTP error status bit 418 can be set with a logic 1. A decision is made as to whether or not a link down with transaction pending error mask bit is cleared (i.e., the bit value is a logic "0") in decision block 520. For example, LDTP error mask bit 428 can include a logic 0 or a logic 1. If the link down with transaction pending error mask bit is not cleared, the NO branch of decision block 520 is taken and the method ends in block 536. If the link down with transaction pending error mask bit is cleared, the YES branch of decision block 520 is taken, an AER message is sent to the root port in block 534, and the method ends in block 536.

Figure 6:
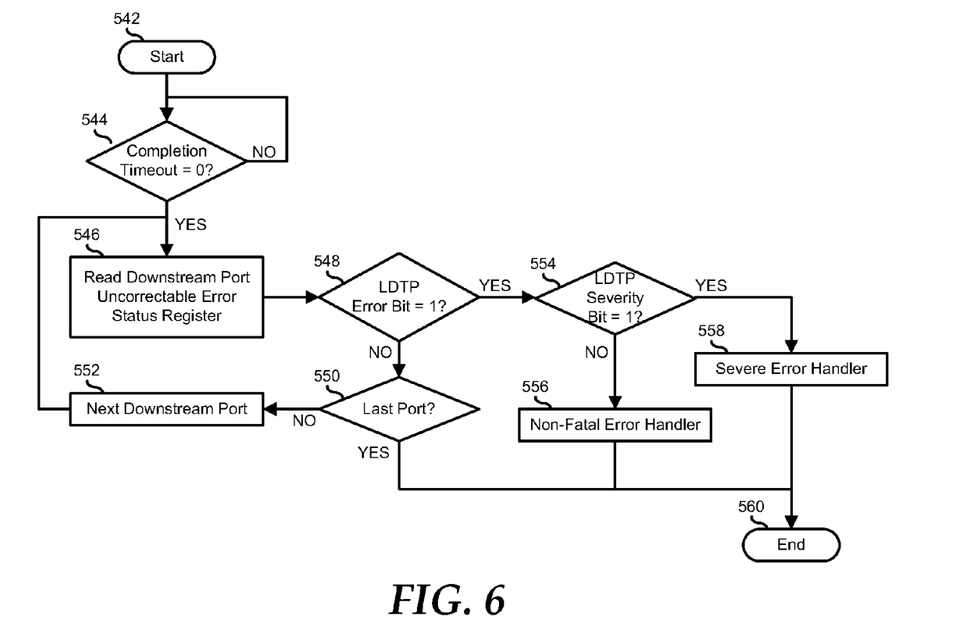
FIG. 6 is a flowchart illustrating a method of determining at a root port which downstream port experienced a surprise removal.

FIG. 6 illustrates a method of determining at a root port which downstream port experienced a surprise removal. The method begins at step 542 and a decision is made as to whether or not a completion timeout counter has a value equal to zero in decision block 544. If not, the NO branch of decision block 544 is taken, and the method continues through decision block 544 until the completion timeout has a value equal to zero. When the completion timeout has a value equal to zero, the YES branch of decision block 544 is taken, and the root port reads the uncorrectable error status register for a DSP in block 546. A decision is made as to whether or not a link down with transaction pending error status bit for the DSP is set in decision block 548. If the link down with transaction pending error status bit is set, the YES branch of decision block 548 is taken, and the method continues in decision block 554, as described below. If the link down with transaction pending error status bit is not set, the NO branch of decision block 548 is taken and a decision is made as to whether or not the port is the last port under the root port in decision block 550. If the port is not the last port under the root port, the NO branch of decision block 550 is taken, a next DSP is selected in block 552, and the method continues at block 546 where the root port reads the uncorrectable error status register for the next DSP. If the port is the last port under the root port, the YES branch of decision block 550 is taken and the method ends at block 560.

If the link down with transaction pending error status bit is set as determined in decision block 548, the YES branch is taken and a decision is made as to whether or not a link down with transaction pending error severity bit is set in decision block 554. If so, the YES branch of decision block 554 is taken, a sever error handler is invoked in block 558, and the method ends in block 560. If the link down with transaction pending error severity bit is not set, the NO branch of decision block 554 is taken, a non-fatal error handler is invoked in block 556, and the method ends in block 560.

Figure 7:
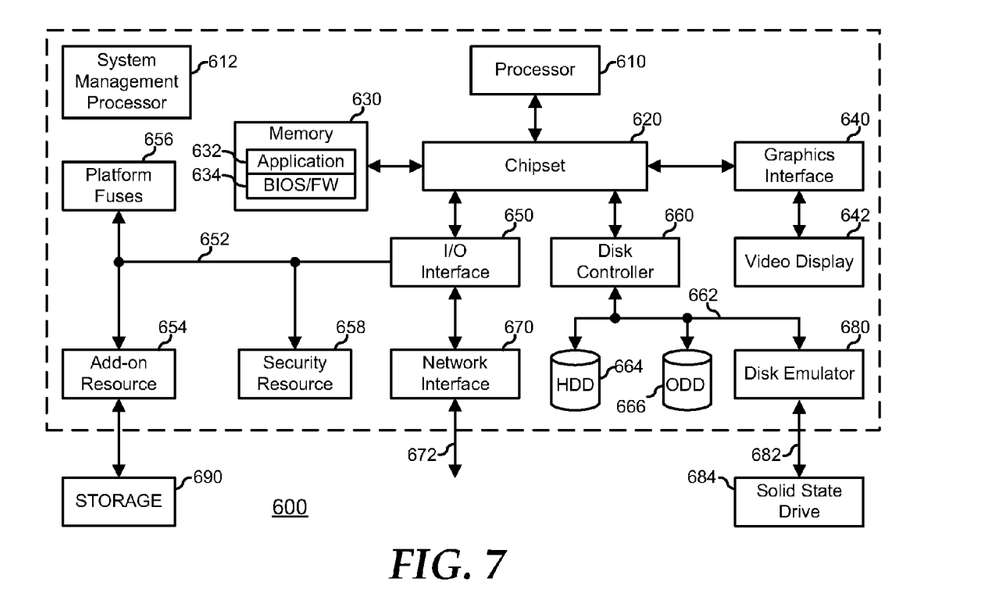
FIG. 7 is a block diagram illustrating an information handling system according to an embodiment of the present disclosure.

FIG. 7 is a block diagram illustrating an embodiment of an information handling system 600, including a processor 610, a system management processor 612, a chipset 620, a memory 630, a graphics interface 640, an input/output (I/O) interface 650, a disk controller 660, a network interface 670, and a disk emulator 680. In a particular embodiment, information handling system 600 is used to carry out one or more of the methods described herein. In another embodiment, one or more of the systems described herein are implemented in the form of information handling system 600. System management processor 612 is an embedded processor that enables remote monitoring and management of information handling system 600. In a particular embodiment, system management processor 612 is separate from the elements of information handling system 600, includes a separate operating system and applications, and is connected to a separate network.

Chipset 620 is connected to and supports processor 610, allowing the processor to execute machine-executable code. In a particular embodiment (not illustrated), information handling system 600 includes one or more additional processors, and chipset 620 supports the multiple processors, allowing for simultaneous processing by each of the processors and permitting the exchange of information among the processors and the other elements of the information handling system. Chipset 620 can be connected to processor 610 via a unique channel, or via a bus that shares information among the processor, the chipset, and other elements of information handling system 600.

Memory 630 is connected to chipset 620. Memory 630 and chipset 620 can be connected via a unique channel, or via a bus that shares information among the chipset, the memory, and other elements of information handling system 600. In another embodiment (not illustrated), processor 610 is connected to memory 630 via a unique channel. In another embodiment (not illustrated), information handling system 600 includes separate memory dedicated to each of the one or more additional processors. A non-limiting example of memory 630 includes static random access memory (SRAM), dynamic random access memory (DRAM), nonvolatile random access memory (NVRAM), read only memory (ROM), flash memory, another type of memory, or any combination thereof.

Graphics interface 640 is connected to chipset 620. Graphics interface 640 and chipset 620 can be connected via a unique channel, or via a bus that shares information among the chipset, the graphics interface, and other elements of information handling system 600. Graphics interface 640 is connected to a video display 642. Other graphics interfaces (not illustrated) can also be used in addition to graphics interface 640 as needed or desired. Video display 642 includes one or more types of video displays, such as a flat panel display, another type of display device, or any combination thereof.

I/O interface 650 is connected to chipset 620. I/O interface 650 and chipset 620 can be connected via a unique channel, or via a bus that shares information among the chipset, the I/O interface, and other elements of information handling system 600. Other I/O interfaces (not illustrated) can also be used in addition to I/O interface 650 as needed or desired. I/O interface 650 is connected via an I/O interface 652 to one or more add-on resources 654. Add-on resource 654 is connected to a storage system 690, and can also include another data storage system, a graphics interface, a network interface card (NIC), a sound/video processing card, another suitable add-on resource or any combination thereof. I/O interface 650 is also connected via I/O interface 652 to one or more platform fuses 656 and to a security resource 658. Platform fuses 656 function to set or modify the functionality of information handling system 600 in hardware. Security resource 658 provides a secure cryptographic functionality and includes secure storage of cryptographic keys. A non-limiting example of security resource 658 includes a Unified Security Hub (USH), a Trusted Platform Module (TPM), a General Purpose Encryption (GPE) engine, another security resource, or a combination thereof.

Disk controller 660 is connected to chipset 620. Disk controller 660 and chipset 620 can be connected via a unique channel, or via a bus that shares information among the chipset, the disk controller, and other elements of information handling system 600. Other disk controllers (not illustrated) can also be used in addition to disk controller 660 as needed or desired. Disk controller 660 includes a disk interface 662. Disk controller 660 is connected to one or more disk drives via disk interface 662. Such disk drives include a hard disk drive (HDD) 664, and an optical disk drive (ODD) 666, and can include one or more disk drive as needed or desired. ODD 666 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 660 is connected to disk emulator 680. Disk emulator 680 permits a solid-state drive 684 to be coupled to information handling system 600 via an external interface 682. External interface 682 can include industry standard busses such as USB or IEEE 1394 (Firewire) or proprietary busses, or any combination thereof. Alternatively, solid-state drive 684 can be disposed within information handling system 600.

Network interface device 670 is connected to I/O interface 650. Network interface 670 and I/O interface 650 can be coupled via a unique channel, or via a bus that shares information among the I/O interface, the network interface, and other elements of information handling system 600. Other network interfaces (not illustrated) can also be used in addition to network interface 670 as needed or desired. Network interface 670 can be a network interface card (NIC) disposed within information handling system 600, on a main circuit board such as a baseboard, a motherboard, or any combination thereof, integrated onto another component such as chipset 620, in another suitable location, or any combination thereof. Network interface 670 includes a network channel 672 that provide interfaces between information handling system 600 and other devices (not illustrated) that are external to information handling system 600. Network interface 670 can also include additional network channels (not illustrated).

Information handling system 600 includes one or more application programs 632, and Basic Input/Output System and Firmware (BIOS/FW) code 634. BIOS/FW code 634 functions to initialize information handling system 600 on power up, to launch an operating system, and to manage input and output interactions between the operating system and the other elements of information handling system 600. In a particular embodiment, application programs 632 and BIOS/FW code 634 reside in memory 630, and include machine-executable code that is executed by processor 610 to perform various functions of information handling system 600. In another embodiment (not illustrated), application programs and BIOS/FW code reside in another storage medium of information handling system 600. For example, application programs and BIOS/FW code can reside in HDD 664, in a ROM (not illustrated) associated with information handling system 600, in an option-ROM (not illustrated) associated with various devices of information handling system 600, in storage system 690, in a storage system (not illustrated) associated with network channel 672, in another storage medium of information handling system 600, or a combination thereof. Application programs 632 and BIOS/FW code 634 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A Peripheral Component Interconnect-Express (PCIe) port comprising:
   a PCIe link;
   a pending transaction counter; and
   an error status register;
   the PCIe port being operable to:
      issue a first transaction on the PCIe link;
      determine that an endpoint device has become uncoupled from the PCIe link after issuing the first transaction;
      determine that a first value stored in the pending transaction counter is not equal to zero in response to determining that the endpoint device has become uncoupled;
      set a first error bit in the error status register in response to determining that the first value is not equal to zero;
      issue a second transaction on the PCIe link; and
      decrement the pending transaction counter in response to receiving an acknowledgement from the endpoint device indicating that the endpoint device received the second transaction.

2. The PCIe port of claim 1, wherein the PCIe port is further operable to increment the pending transaction counter in response to issuing the first transaction.

3. The PCIe port of claim 1, further comprising:
   an error mask register including a mask bit that is associated with the first error bit.

4. The PCIe port of claim 3, wherein the PCIe port is further operable to:
   determine a second value stored in the mask bit.

5. The PCIe port of claim 4, wherein the PCIe port is further operable to:
   send an advanced error reporting packet to a PCIe root port in response to setting the first error bit and in further response to determining that the second value is a one.

6. The PCIe port of claim 3, further comprising:
   an error severity register including a severity bit that is associated with the first error bit.

7. The PCIe port of claim 1, wherein the PCIe port is further operable to:
   determine that the first value is equal to zero in response to determining that the endpoint device has become uncoupled; and
   set a second error bit in the error status register in response to determining that the first value is equal to zero.

8. The PCIe port of claim 7, wherein the PCIe port is further operable to:
   receive a second transaction;
   determine that the endpoint device has become uncoupled from the PCIe link before receiving the second transaction; and
   set a third error bit in the error status register in response to determining that the endpoint device was uncoupled before receiving the second transaction.

9. A method comprising:
   receiving a first transaction at a Peripheral Component Interconnect-Express (PCIe) port;
   issuing the first transaction on a PCIe link of the PCIe port;
   determining that an endpoint device has become uncoupled from the PCIe link after issuing the first transaction;
   determining that a first value stored in a pending transaction counter is not equal to zero in response to determining that the endpoint device has become uncoupled;
   setting a first error bit in an error status register in response to determining that the first value is not equal to zero;
   issuing a second transaction on the PCIe link; and
   decrementing the pending transaction counter in response to receiving an acknowledgement from the endpoint device indicating that the endpoint device received the second transaction.

10. The method of claim 9, further comprising:
    incrementing the pending transaction counter in response to issuing the first transaction.

11. The method of claim 9, further comprising:
    determining a second value stored in a mask bit associated with the first error bit.

12. The method of claim 11, further comprising:
    sending an advanced error reporting packet to a PCIe root port in response to setting the first error bit and in further response to determining that the second value is a one.

13. The method of claim 9, further comprising:
    determining that the first value is equal to zero in response to determining that the endpoint device has become uncoupled; and
    setting a second error bit in the error status register in response to determining that the first value is equal to zero.

14. The method of claim 13, further comprising:
    receiving a second transaction;
    determining that the endpoint device has become uncoupled from the PCIe link before receiving the second transaction; and
    setting a third error bit in the error status register in response to determining that the endpoint device was uncoupled before receiving the second transaction.

15. Machine-executable code for an information handling system, wherein the machine-executable code is embedded in a non-transitory storage medium and includes instructions for carrying out a method, the method comprising:
    receiving a first transaction at a Peripheral Component Interconnect-Express (PCIe) port;
    issuing the first transaction on a PCIe link of the PCIe port;
    incrementing the pending transaction counter in response to issuing the first transaction;
    determining that an endpoint device has become uncoupled from the PCIe link after issuing the first transaction;
    determining that a first value stored in a pending transaction counter is not equal to zero in response to determining that the endpoint device has become uncoupled;
    setting a first error bit in an error status register in response to determining that the first value is not equal to zero;
    issuing a second transaction on the PCIe link; and
    decrementing the pending transaction counter in response to receiving an acknowledgement from the endpoint device indicating that the endpoint device received the second transaction.

16. The machine executable code of claim 15, the method further comprising:
    determining a second value stored in a mask bit associated with the first error bit; and
    sending an advanced error reporting packet to a PCIe root port in response to setting the first error bit and in further response to determining that the second value is a one.

17. The machine executable code of claim 15, the method further comprising:
    determining that the first value is equal to zero in response to determining that the endpoint device has become uncoupled;
    setting a second error bit in the error status register in response to determining that the first value is equal to zero;
    receiving a second transaction;
    determining that the endpoint device has become uncoupled from the PCIe link before receiving the second transaction; and
    setting a third error bit in the error status register in response to determining that the endpoint device was uncoupled before receiving the second transaction.

* * * * *